(12) United States Patent
Maguire et al.

(10) Patent No.: US 8,608,477 B2
(45) Date of Patent: Dec. 17, 2013

(54) SELECTIVE WRITING ASSESSMENT WITH TUTORING

(75) Inventors: Brian C. Maguire, New Hope, PA (US);
Kevin M. MacClay, Newtown, PA (US);
Lorna Maguire, New Hope, PA (US)

(73) Assignee: Vantage Technologies Knowledge Assessment, L.L.C., Newtown, PA (US)

( * ) Notice: Subject to any disclaimer, the term of this patent is extended or adjusted under 35 U.S.C. 154(b) by 935 days.

(21) Appl. No.: 11/400,640

(22) Filed: Apr. 6, 2006

(65) Prior Publication Data

US 2007/0238084 A1    Oct. 11, 2007

(51) Int. Cl.
*G09B 19/00* (2006.01)

(52) U.S. Cl.
USPC .......................................... 434/156; 434/157

(58) Field of Classification Search
USPC ........................... 433/322, 353; 434/156, 165
See application file for complete search history.

(56) References Cited

U.S. PATENT DOCUMENTS

| | | |
|---|---|---|
| 4,978,305 A | 12/1990 | Kraft |
| 5,010,495 A | 4/1991 | Willetts |
| 5,170,362 A | 12/1992 | Greenberg et al. |
| 5,302,132 A | 4/1994 | Corder |
| 5,387,104 A | 2/1995 | Corder |
| 5,437,554 A | 8/1995 | Clark et al. |
| 5,558,521 A | 9/1996 | Clark et al. |
| 5,565,316 A | 10/1996 | Kershaw et al. |
| 5,597,312 A | 1/1997 | Bloom et al. |
| 5,664,115 A | 9/1997 | Fraser |
| 5,672,060 A | 9/1997 | Poor |
| 5,692,906 A | 12/1997 | Corder |
| 5,706,502 A | 1/1998 | Foley et al. |
| 5,709,551 A | 1/1998 | Clark et al. |
| 5,716,213 A | 2/1998 | Clark et al. |
| 5,735,694 A | 4/1998 | Clark et al. |
| 5,827,070 A | 10/1998 | Kershaw et al. |
| 5,862,223 A | 1/1999 | Walker et al. |
| 5,879,165 A * | 3/1999 | Brunkow et al. ............. 434/322 |
| 5,907,831 A | 5/1999 | Lotvin et al. |
| 5,930,777 A | 7/1999 | Barber |
| 5,947,747 A | 9/1999 | Walker et al. |
| 5,974,446 A | 10/1999 | Sonnenreich et al. |
| 5,987,149 A | 11/1999 | Poor |
| 5,987,302 A * | 11/1999 | Driscoll et al. ............... 434/353 |
| 5,991,595 A | 11/1999 | Ronano et al. |
| 6,009,412 A | 12/1999 | Storey |
| 6,042,384 A | 3/2000 | Loiacono |
| 6,112,049 A | 8/2000 | Sonnenfeld |
| 6,120,299 A | 9/2000 | Trenholm et al. |
| 6,157,926 A | 12/2000 | Appleman et al. |
| 6,173,154 B1 | 1/2001 | Kucinski et al. |
| 6,183,260 B1 | 2/2001 | Clark et al. |
| 6,183,261 B1 | 2/2001 | Clark et al. |

(Continued)

*Primary Examiner* — Robert J Utama
(74) *Attorney, Agent, or Firm* — RatnerPrestia

(57) ABSTRACT

An on-line, computerized, software-driven system provides writing assessment of submitted essays with instructional feedback. The feedback incorporates comments and prompts provided to the user which are generated in response to the assessment evaluation of written text. Skill level and developmental level comments, remarks and prompts on various genre specific domain areas are provided in a real-time mode or in a request response mode, as elected by the user. Assessment and scores are provided by machine methods driven by a software engine. All appropriate comments and prompts are generated to the user by analysis logic software operating on a database of genre specific, educationally acceptable comments and prompts.

21 Claims, 9 Drawing Sheets

(56) References Cited

U.S. PATENT DOCUMENTS

| | | |
|---|---|---|
| 6,201,948 B1 | 3/2001 | Cook et al. |
| 6,234,806 B1 | 5/2001 | Trenholm et al. |
| 6,256,399 B1 | 7/2001 | Poor |
| 6,295,439 B1 | 9/2001 | Bejar et al. |
| 6,311,040 B1 | 10/2001 | Kucinski et al. |
| 6,466,683 B1 | 10/2002 | Poor |
| 6,513,042 B1 | 1/2003 | Anderson et al. |
| 6,526,258 B2 | 2/2003 | Bejar et al. |
| 6,558,166 B1 | 5/2003 | Clark et al. |
| 6,577,846 B2 | 6/2003 | Poor |
| 6,684,052 B2 | 1/2004 | Kucinski et al. |
| 6,685,476 B1 | 2/2004 | Safron, Sr. |
| 6,755,659 B2 | 6/2004 | LoSasso et al. |
| 6,772,081 B1 | 8/2004 | Gedlinske et al. |
| 6,796,800 B2 | 9/2004 | Burstein et al. |
| 7,031,651 B2 * | 4/2006 | McCormick et al. ......... 434/350 |
| 7,062,220 B2 * | 6/2006 | Haynes et al. ................ 434/353 |
| 7,493,396 B2 * | 2/2009 | Alcorn et al. ................. 709/225 |
| 2002/0156632 A1 * | 10/2002 | Haynes et al. ................ 704/270 |
| 2003/0031996 A1 * | 2/2003 | Robinson ...................... 434/350 |
| 2004/0121298 A1 | 6/2004 | Creamer et al. |
| 2004/0190774 A1 * | 9/2004 | Baker .......................... 382/187 |
| 2004/0250209 A1 * | 12/2004 | Norcross et al. .............. 715/700 |
| 2005/0069856 A1 | 3/2005 | Apichella et al. |
| 2005/0073412 A1 * | 4/2005 | Johnston et al. ............. 340/552 |
| 2005/0084830 A1 * | 4/2005 | Kaufmann .................... 434/169 |
| 2005/0142529 A1 * | 6/2005 | Andreyev et al. ............. 434/362 |
| 2006/0003306 A1 | 1/2006 | McGinley et al. |
| 2006/0019223 A1 * | 1/2006 | Wood et al. .................. 434/156 |
| 2006/0046239 A1 * | 3/2006 | Allen et al. ................... 434/353 |
| 2006/0084049 A1 * | 4/2006 | Lucas .......................... 434/323 |
| 2006/0105303 A1 * | 5/2006 | Ames et al. .................. 434/165 |
| 2006/0194184 A1 * | 8/2006 | Wagner ........................ 434/350 |
| 2007/0238084 A1 * | 10/2007 | Maguire et al. .............. 434/353 |

* cited by examiner

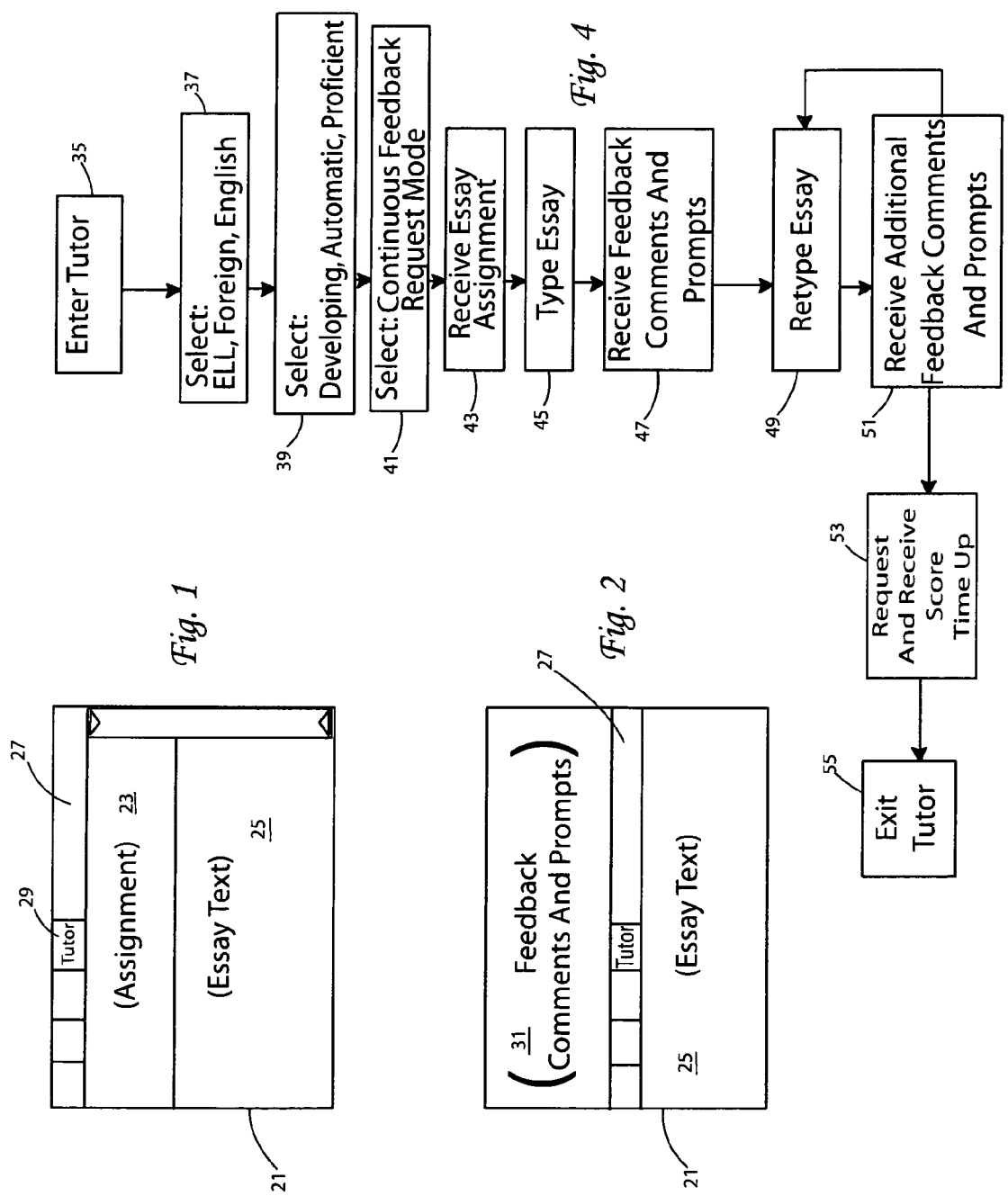

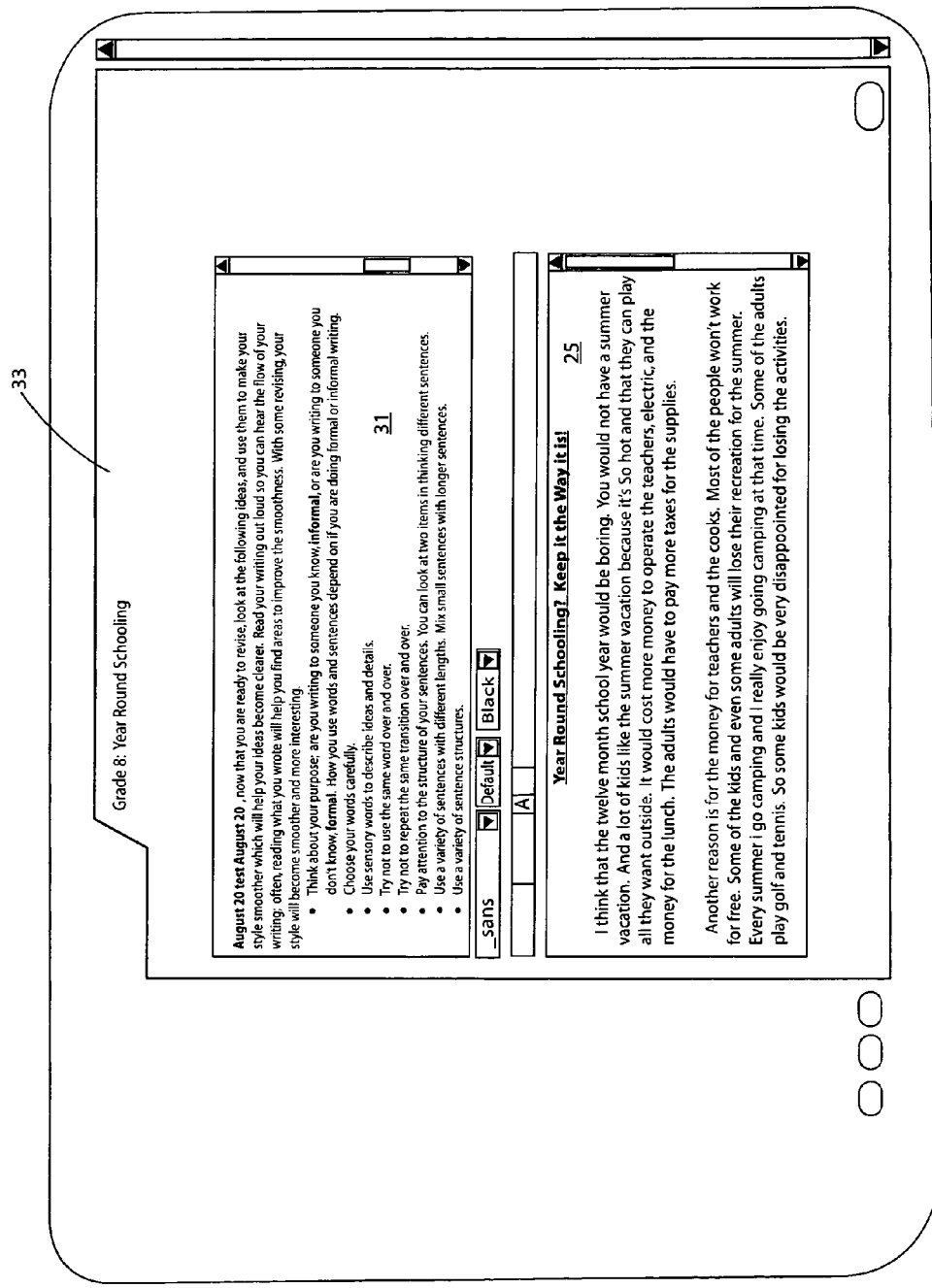

SELECTIVE WRITING ASSESSMENT WITH TUTORING

BACKGROUND OF THE INVENTION

The present invention is related to the field of standardized and assessment testing, and specifically to essay evaluation and scoring.

The use of standardized testing has increased steadily over the past several decades. Standardized tests are now an essential part of almost every educational system. These tests are used for in-grade competency and achievement evaluation, as teaching aides, as measurements of student performance, and for admission and qualification procedures.

These tests were often designed to be scored by machine methods. As a result, multiple choice tests were prevalent in the past. However, there has arisen an ever increasing trend away from multiple choice tests in favor of tests that require open-ended responses, such as essay tests. The assessment and scoring of essay responses to essay test questions has created more labor intensive evaluation systems and systems with increased numbers of decision making parameters.

Generally in the past, essay evaluation systems have operated in the context of a particular test administration. The systems were used to collect, distribute and grade actual test responses for a particular test. Groups of human scorers were engaged to read and score tests working from computer work stations.

Early efforts were directed to essay responses which were "fill-in-the-blank". This fill-in method of essay testing response is less structured and more open ended than multiple choice response, but is an extension of multiple choice answer scoring. Possible correct answers are withheld from the user/test taker. Optical character recognition (OCR) was utilized to read the one or two word answer. The user/test taker answer was compared against a preferred answer and a list of less preferred answers. A score was assigned according to the degree of closeness to the preferred answer.

As students have became more interested in practicing their essay testing skills, and as teachers have began to use essay testing as a teaching aid, there has arisen a need for systems which provided the capability of practicing essay test taking skills, demonstrating content mastery, and providing feedback to the use/essay tester.

A writing evaluation system has been developed by Educational Testing Service, Princeton, N.J. (ETS), which provides on-line evaluation of a constructed essay response to an examination question. A test taker submits an essay response via the Internet. The test response is assigned to a human scorer at a workstation and enters his scoring queue. The scorer evaluates the essay according to assigned calibrated grading guidelines to select an overall evaluation. The scorer can also select from a list of pre-defined generalized comments which characterize the user/test takers submission. A selected comment accompanies the score provided to the user/test taker. A given scorer's performance on a particular essay answer may be evaluated by a scorer leader or supervisor.

The pre-selected comments vary from such overall characterizations as: "your essay is well-developed", to "You offer an analysis of how literary devices are used . . . The essay would be stronger if the analysis were more penetrating".

Although ETS's system is a variable method of evaluating essays through a human process, it is too labor intensive in the scoring and evaluating stage to be an economical offering when evaluating essays for instructional purposes. Moreover, the type of feedback comments offered are intended to be generalized and to provide an overall characterization of the essay response, i.e., on a macro-level, and not to be focused on the mechanics of essay drafting and the mechanics of organization and presentation on a micro-level.

A desired approach and objective of the present invention, which departs from the prior art, is an automated tutoring system which is capable of: (1) scoring a user/test taker's essay response, and of real-time, on-line, micro-evaluations of essay mechanics and organization; (2) providing essay feedback while the user is drafting an essay, on an extemporaneous basis; (3) factoring an open-ended essay response from a user into a plurality of separate conceptual areas of inquiry, for scoring with feedback; and (4) providing for a modification of operation and feedback to a writing prompt from one of a plurality of essay genre.

SUMMARY OF THE INVENTION

The objectives of the present invention are realized in a software-implemented, computerized, on-line "tool" (i.e., a system) that delivers individualized instructional feedback and prescriptive content to an on-line user/student/test-taker, based upon artificial analysis (i.e., automated/machine analysis) of a submitted writing essay-type sample. The user has the choice to select essay drafting analysis on a real-time basis or on a request basis. In the real-time mode, the system analyzes and provides instructional feedback as the essay is drafted. In the request mode, the system analyzes the writing and provides instructional feedback when expressly requested.

The instructional content of the user addressed feedback is genre specific, such as to the following "domains" of writing: narrative, informative, literary, persuasive, and informational/text-based. Focus and meaning, content and development, organization, language use and style, mechanics and conventions are some of the domains of writing that are evaluated and provided to the end user for feedback thereto. A score on a selected scale, such as a 6-point scale or a 4-point scale, can be provided with feedback, but more often is provided when a score is requested or when analysis and instructional feedback is provided in the request mode.

The instructional content is provided in various specific proficiency levels. In one implementation, the instructional content is provided in two readability levels: "proficient", e.g., 6th grade or higher as determined by Flesh-Kincaid level index; and "developing", e.g., readability less than 6th grade.

The system may also provide the feedback in the form of comments and feedback translated into the end users native speaking and reading language. For example, a natively speaking Chinese student writing in English may benefit from receiving tutoring feedback of an English essay in Chinese. It has been found that feedback on a language that someone is learning can be retained better and understood more easily if the feedback is communicated in the language best understood by the student/end user. An ELL (English learning language) student may submit an essay written in English and receive comments and prompts in English or in a selected foreign language.

The system may also receive inputs from a student peer, the student himself (herself), a teacher, a parent, an employment supervisor, or an administrator in order to configure the essay assignments and feedback more appropriately for each specific user, student, or test taker.

BRIEF DESCRIPTION OF THE DRAWINGS

The features, advantage and operation of the present invention will become readily apparent and further understood from a reading of the following detailed description with the accompanying drawings, in which like numerals refer to like elements, and in which:

FIG. 1 shows a computer workstation display screen with separate fields of information;

FIG. 2 shows the workstation display screen of FIG. 1 with the selection bar moved down between the two fields when the system is in operation;

FIG. 3 shows the workstation display screen of FIG. 1 with an example of a typical prompting page;

FIG. 4 is a flow chart of the process steps in assigning, analyzing, scoring and prompting an essay;

DETAILED DESCRIPTION OF THE INVENTION

Figure 5:
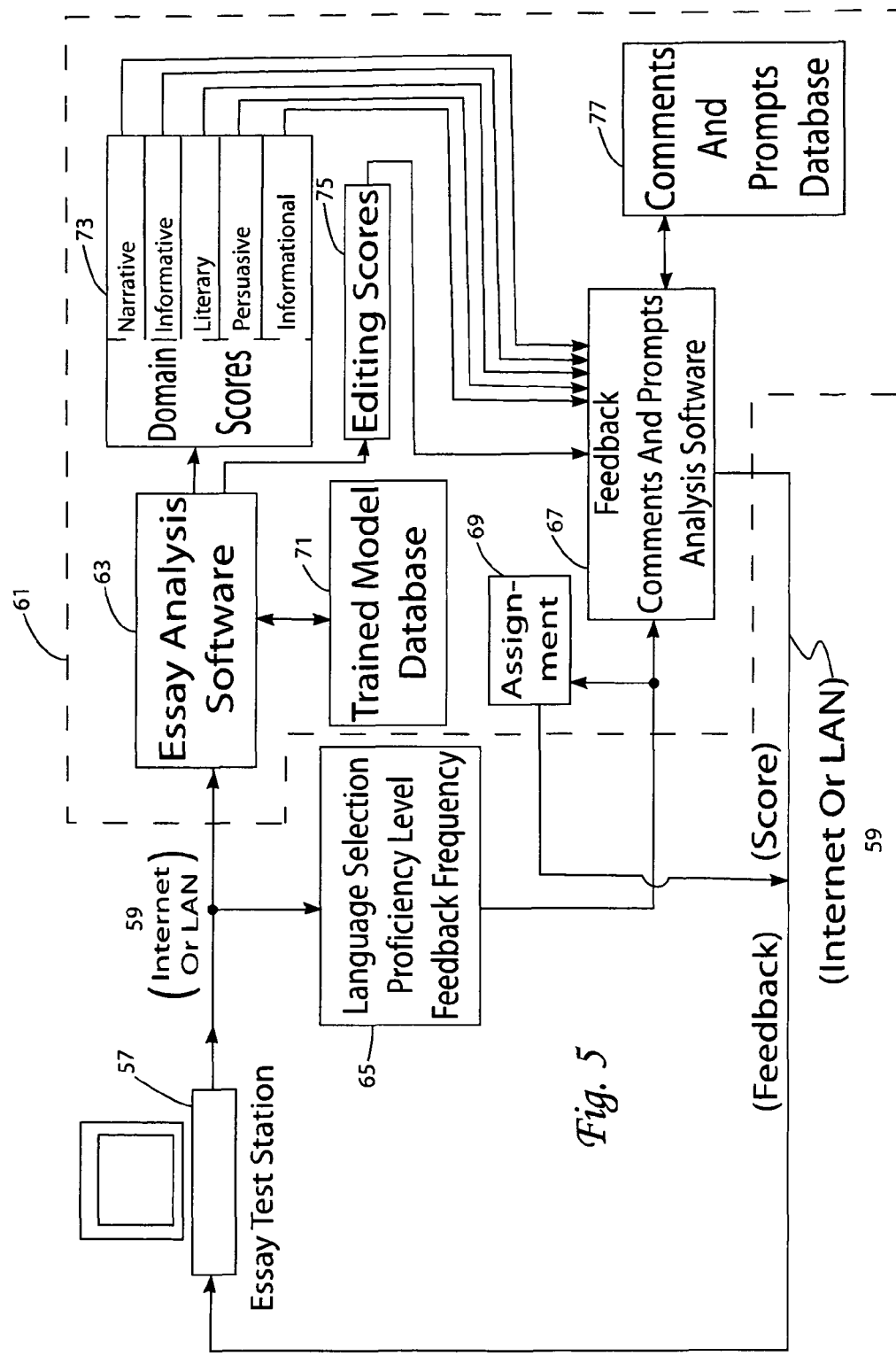
FIG. 5 is a block diagram of the system macro-components for essay scoring and feedback tutoring.

The present invention is a system and a process for analyzing and editing an essay that is submitted on-line, and then processed by the system. The invention provides the user/student/test-taker with a single click feedback or with automatic writing editing feedback. A student logs-on at a workstation where the screen requests information about the student. This information is either entered by the student or by the teacher or administrator. The student is then assigned, or alternatively, selects a writing subject, with prompts or with pertinent instructions on what to focus the writing towards. The on-line system can be configured to customize the writing environment and the tools available in writing and essay.

A text area of the workstation display is dedicated to web-based word processing. This word processing essay is evaluated at a remote location when a tutor selection button on the screen is "clicked". The entire text or a portion of it can be selected for evaluation and feedback. Feedback can be an inquiry or a suggestion or an instruction. The essay or portion thereof to be evaluated is passed through a computerized text scoring engine which provides one or more output scores.

These scores are used by the system to search a database of possible feedback comments and prompts. Feedback comments, being tutoring instruction are selected as a function of the character of the score, are sent to the student. These feedback comments and prompts appear on a separate dedicated portion of the student workstation display.

The mode and type of feedback will depend upon the level of instruction which in turn is determined by the proficiency level, demographics, and educational goals of the user-student. The student proficiency level can be manually entered (selected) by the teacher-administrator or determined automatically. Manual selection (by clicking an appropriate button on the display) can be between a "proficient" mode, i.e., readability at grade 6 and above, and a "developing" mode, i.e., readability below grade 6. In the automatic mode, analyzing software (software engine) detects readability (writing level) according to a Flesh-Kincaid scale.

The system also has input to it an indication of the language goals of the user-student. The teacher-administrator manually selects (by clicking an appropriate button on the display) between ELL (English language learner), English (English speaking student writing an essay in English), Chinese (Chinese speaking student writing an essay in Spanish), and Spanish (Spanish speaking student writing an essay in Spanish). For ELL students, the teacher-administrator can also manually select between English, Chinese and Spanish for the language in which the feedback comments and prompts are presented. The feedback can also be presented in both English and/or the selected foreign language that is most relevant to the student's native language.

With this input the essay analysis software is able to look for the most common mistakes made in grammar and sentence structure and comment on them in the order of importance or in the order of most occurrences. For ELL user-students, the analysis engine can access a database of most common mistakes made by each of various foreign language students writing in English.

The feedback comments also address various genre, including the essay areas of: narrative; informative; literature based; and persuasive. The analysis engine has access to a database of trained models for each writing assignment. These models contain essays accumulated on the assignment subject that are considered most exemplary.

Grammar, spelling, syntax, parenthetical phrases, pronoun use, participial phrases, organization and flow are also some of the areas an editing engine in the system addresses. The each area of inquiry is scored. The feedback comments and prompts may be prioritized to those areas with the lowest scores.

Once the student indicates that he/she is submitting the final draft, the entire essay is scored and the score is stored in a database available to the user-student and the teacher-administrator.

The system has the capability of selective writing assessment and tutoring both as to a portion of an essay selected by the student and as to the mode in which the feedback portion of the system operates. In one mode, the essay is evaluated in real time, as the essay is typed. In another selected mode, the essay is evaluated when a request is made for evaluation. This is affected by "clicking" a evaluation request button on the display.

The essay/text scoring engine scores the essay based on historical data of previously scored essays on the same topic.

The feedback selection engine implements a decision making algorithm based upon student characteristics first input and upon the respective scoring of the essay/text scoring engine.

Multiple evaluations for feedback are at the student user's discretion. Partial evaluations or an evaluation of the essay as a whole are also selectable.

The user-student workstation display 21, FIG. 1, is divided into two areas, the top portion for the assignment 23 on which the student is to write, and the bottom portion for word processing 25. A top tool bar 27 contains a number to tutor specific pull-down screens 29 Once the student enters the tutoring phase of the process, the display 21 changes FIG. 2. In this phase the tool bar 27 now separates a top portion for feedback comments and prompts 31 from the bottom portion for word processing 25.

FIG. 3 shows the workstation display 21 with a typical prompting page with prompts 31 and essay 25. The process for tutoring, FIG. 4, includes entering the tutor program, step 35, selecting between ELL, foreign language, English, step 37, then selecting between developing automatic and proficient, step 39. A further selection is between continuous feedback and request mode feedback, step 41.

Once the selections are made, the student receives the assignment, step 43 and begins to type the essay, step 45. Thereafter feedback comments and prompts are sent to the student, step 47, which enables the student to redraft the essay step 49. In this regard, the student can highlight a portion of the essay and request tutoring on the highlighted portion.

The student receives additional feedback comments and prompts, step 51 after redrafting. Steps 49 and 51 are repeated until the student considers he/she is finished or the time period for drafting that has been set by the teacher-administrator expires. When the time is up or the student expressly requests a score, step 53, a score is provided and the tutor is exited, step 55.

The system, FIG. 5, includes a user-student work station 57 which is situated at any convenient location and connected to the Internet or a LAN (local area network) 59. A network server 61 is connected to the Internet or LAN to receive the essay from the test station 57. In the server 61 the received text is operated upon by essay analysis software engine 63.

The language selection, the proficiency level, and the feedback frequency instructions 65 are received by a feedback comments and prompts analysis software engine 67 within the server 61 and by the assignment engine 69 (software and database) within the server 61. The assignment engine 69 then sends an assignment via the Internet or LAN connection 59 to the workstation 57.

The essay analysis software 63 accesses a trained model database 71 containing model essay responses for each essay assignment. These are used by the essay analysis engine 63 in analyzing and scoring the essay effort of the student.

The essay analysis engine 63 produces domain scores 73 and editing scores 75 which are each sent to the feedback comments and prompts analysis engine 67. This engine 67 determines the appropriate feedback and priority order of the comments to be sent to the workstation. This engine accesses a database of pre-constructed comments and prompts 77 for every combination of scores, instructions, and student particular facts.

Figure 6:
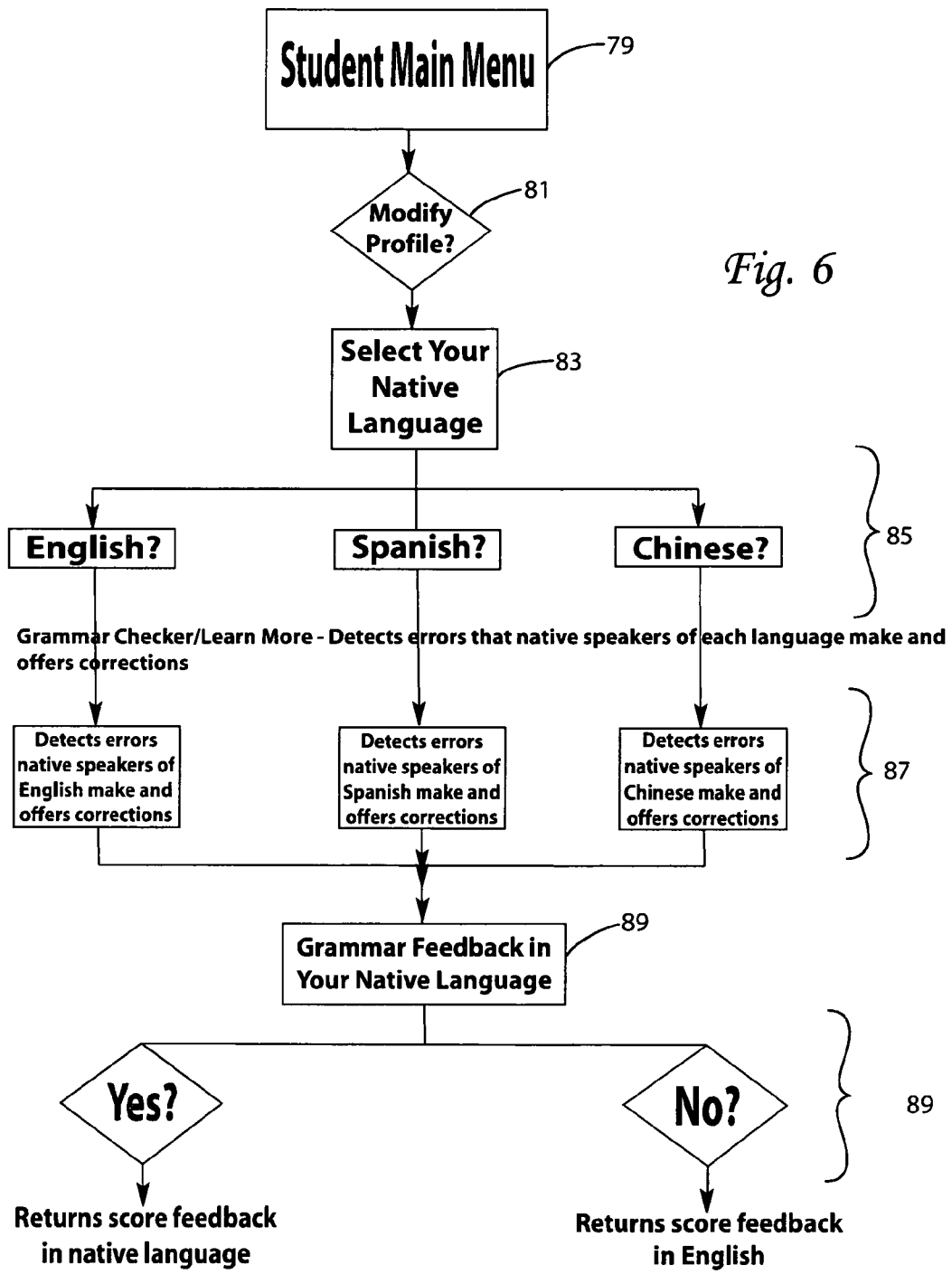
FIG. 6 is a logic diagram for the entry selection upon entering the tutoring system.

When the main student menu is entered, step 79, FIG. 6, it is determined if the student profile is to be modified, step 81. Then the workstation is queried for a selection of the native language of the student, step 83. A selection is made between many languages, but not limited to English, Spanish and Chinese, step 85. Depending upon the selection, the system is adjusted to detect grammar and other text drafting errors that native speakers make and offer corrections, step 87. The workstation is queried on preference of language for the grammar feedback, step 89.

Figure 7:
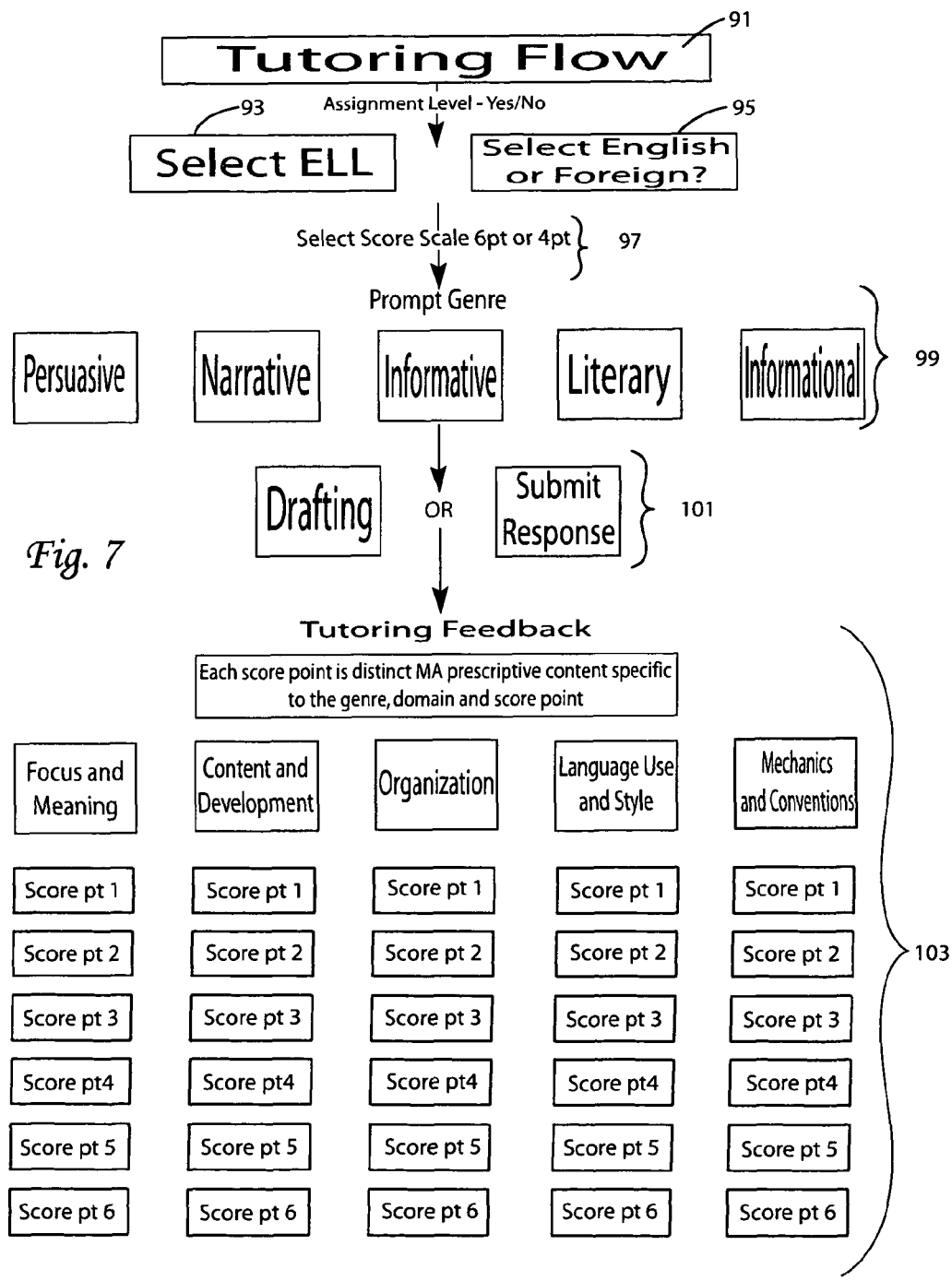
FIG. 7 is a flow chart of the macro-steps of the tutoring process conducted by the system.

FIG. 7 is a flow chart of the macro-steps implemented by the system of FIG. 5. The process is entered, step 91, a selection of ELL is queried 93, and a selection of English or foreign language is queried 95. The scoring scale is selected for either a 6 point or a 4 point scale, step 97. A genre prompt is then made between the various domains, step 99. It is then determined if the feedback prompts and comments are to be provided in real-time while the student is drafting the essay or when a score request is submitted, step 101. The feedback analysis engine then locates the prescribed feedback response as a fact of the score and grammar analysis statistics in each of the domains examined, step 103.

Figure 8:
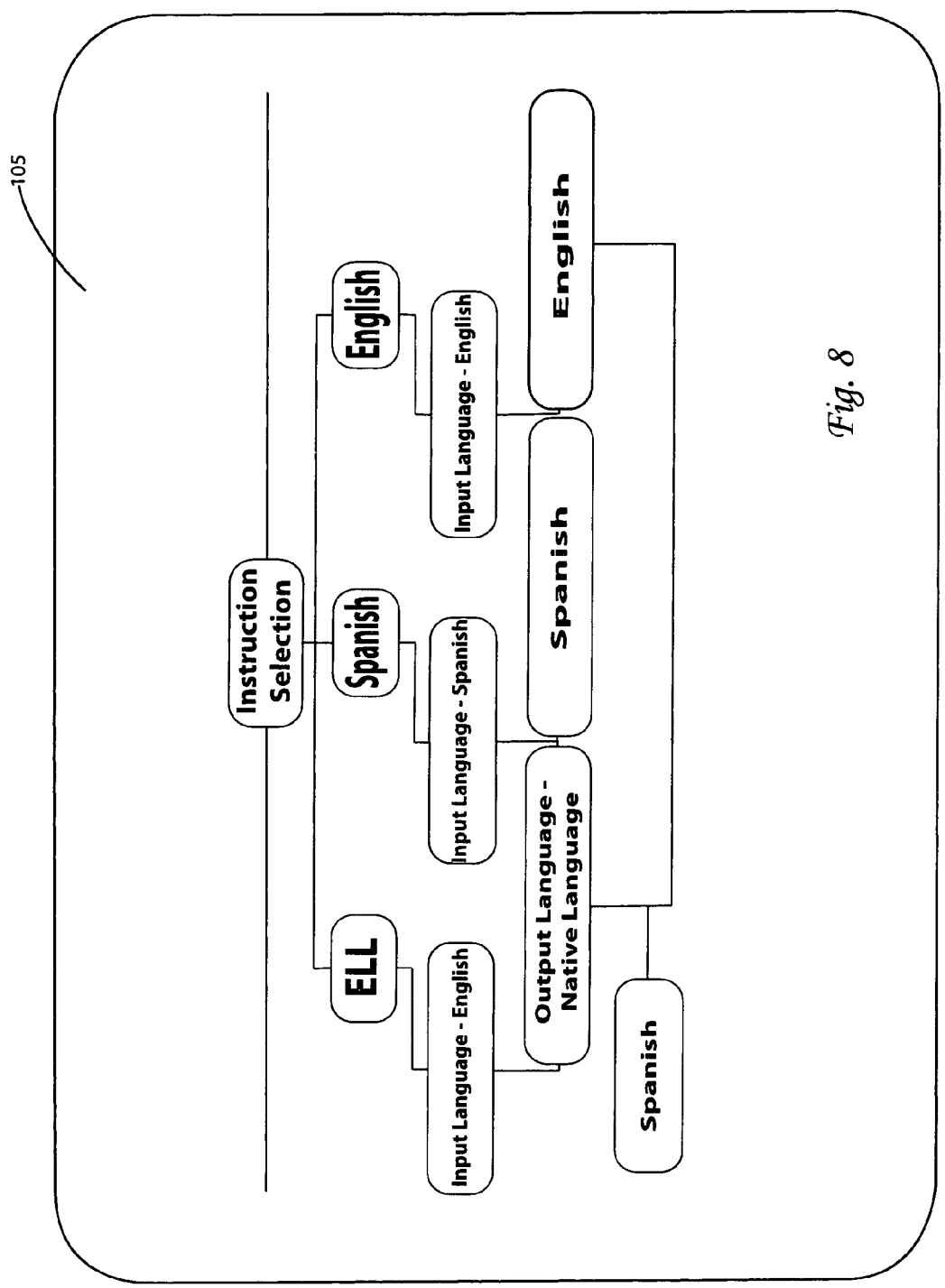
FIG. 8 shows an example of the workstation display screen with the editing and language selections available for on-screen selection.

FIG. 8 shows the workstation instruction screen 105 for selecting the student data on English and foreign language ability for grammar and text editing analysis.

Figure 9:
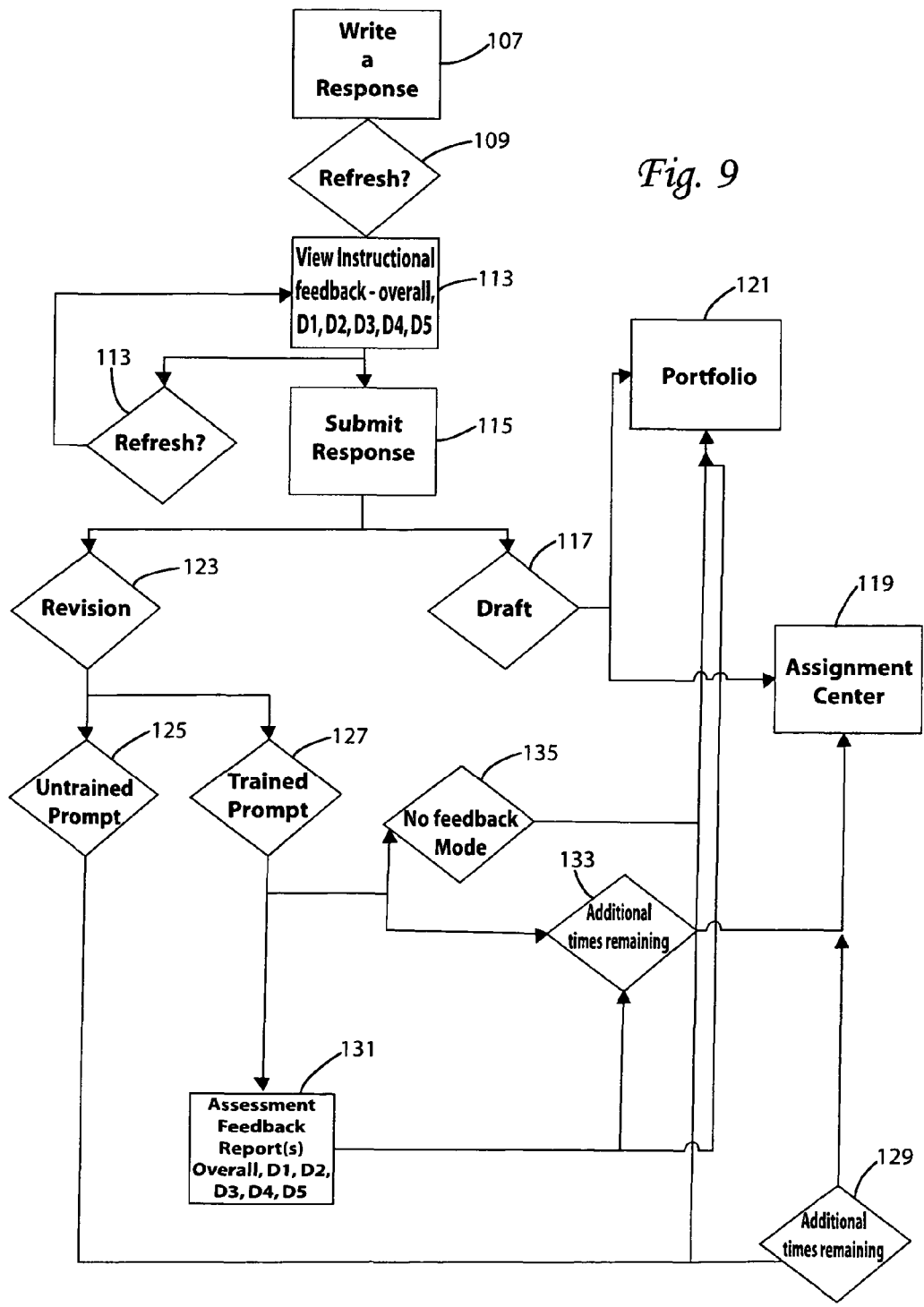
FIG. 9 is a logic diagram for the revision feedback, report process conducted by the system.

Writing control platform logic for interfacing with a student workstation is shown in FIG. 9. The process executed by the software begins with the display of an assignment instruction, step 107. It is then determined if a refresh is needed, step 109. If feedback instructions are available, they are provided for viewing, step 111. This screen is refreshed as needed, step 113. A student response, being a text offering is then searched for and received, step 115.

If the text offering is a first draft, step 117, the draft is matched against the student's assignment information, step 119 and the draft is stored in a portfolio established for the student, step 121.

If the text offering is a revision, step 123, it is analyzed to determine if there exists an untrained prompt 125 or a trained prompt 127. Untrained prompts address grammar and editing issues. Trained prompts address genre domain issues.

If the revision 123 is in response to an untrained prompt 125 then the history is evaluated to determine if there are additional times remaining for such revisions, step 129 and this information is matched against the student's assignment information, step 119.

If there is a trained prompt 127, a feedback report is generated for an overall score and fore scores germane to each genre domain, step 131. The genre feedback information is then stored in the student's portfolio, step 121. If there are additional times remaining for further genre domain issues, step 133, that information is match against the student's assignment information, step 119.

If there is a trained prompt 127, the student data is read to determine if a feedback mode (real-time mode) has been selected, step 135. This information is matched against the student's assignment information, step 119 and it is also stored in the student's portfolio, step 121.

Figure 10:
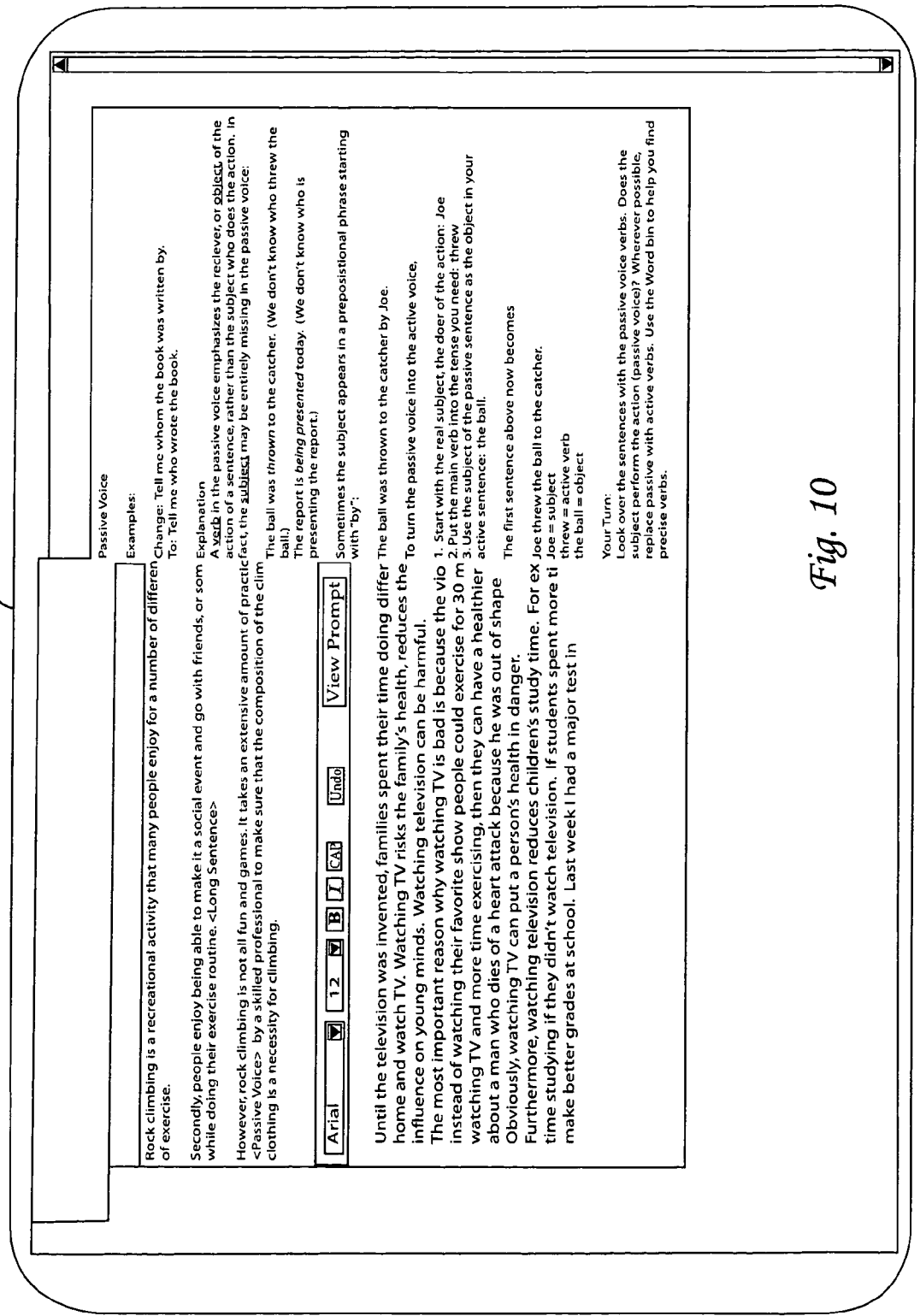
FIG. 10 shows a workstation display screen example with grammar and text editing feedback.

FIG. 10 shows a workstation display screen 137 the editor active and the editing comments and prompts above the student's text essay.

Figure 11:
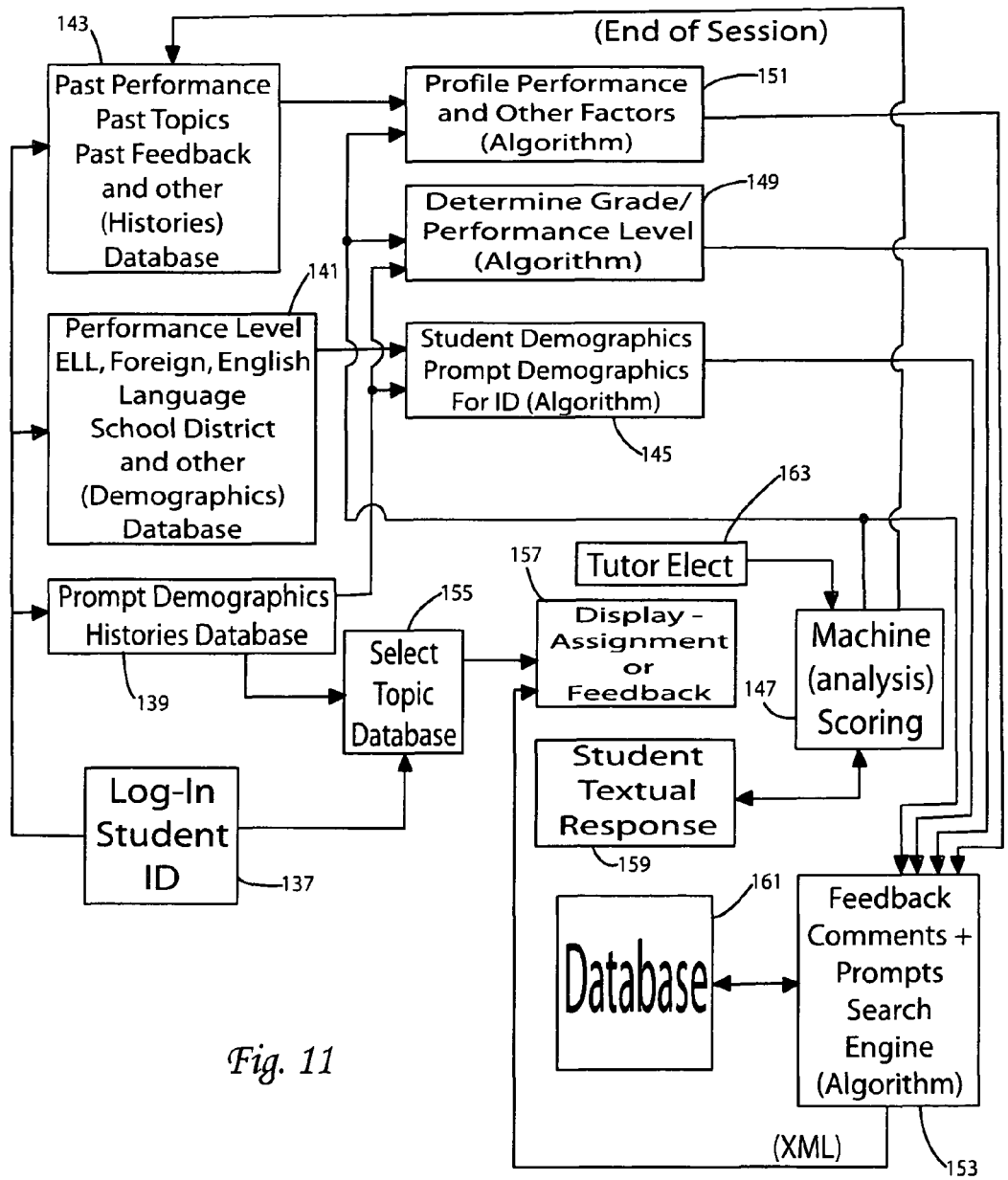
FIG. 11 is a block diagram of the system decision making algorithm and database segments interconnection.

When a student/test taker identification is entered (log-in ID) 137, FIG. 11, this information is sent to "smart" (search processor driven) prompt demographics database (history of prompts for that student) 139, a "smart" database for performance level, language information (ELL, foreign language, English), and other selected data such as school district and other similar information 141, and a "smart" performance history, history of topics, feedback history and other similar information database 143.

The data from the prompt history database 139 undergoes a student and prompt demographics algorithm 145 with additional information from a machine scoring 147 of the text. The data from the performance level, language information database 141 undergoes a grade and performance level determination algorithm 149 with additional information from a machine scoring engine 147 which scores the student text. The data from the past performance, topics and feedback database 143 undergoes a profile performance and other factors algorithm 151 with additional information from a machine scoring engine 147 which scores the student text.

The outputs from these three algorithms 145, 149, 151 is input to a feedback search algorithm engine 153. This engine 153 also receives the scores provided by the machine scoring engine 147 and performs a search algorithm on a database 161 of pre-determined feedback comments.

The student ID 137 information, and the prompt demographics from the database 139 are used to provide a topic about which the student is to write. This is accomplished by a select topic engine 155 operating upon a predetermined topic assignment database which is incorporated with it. The assignment statement is then displayed on a display portion 157 dedicated to information provided to the student at his workstation. This information is either the assignment or tutoring feedback about the essay written at the workstation by the student. The student word processing is displayed on a display portion 159 dedicated to word processing. The data on both display portions 157, 159 is input into the student workstation computer from the system processor through a LAN or an Internet connection, as the connections may be. The output from the feedback search engine 153 to the student workstation can be in many formats such as "XML", text, image, audio, video, or multimedia animation.

It is to be understood that the system may be implemented in discrete circuits such as decoders and the like. The system may also be implemented in discrete components, such as dedicated processors, modems, interface registers and the like. The system may also be implemented on a PC workstation, handheld computer, cell phone/communications device or on a server large enough and operating fast enough to serve the client base and the "visitation" density.

The tutoring mode can be selected to operate automatically or on a selection bases when the student generates a "tutor elect" instruction to the scoring engine 147 from a tutor elect button 163 on his workstation display screen. The tutor elect button 163 is generated on the student workstation screen by instructions from the system after log-in. This signal/instruction is linked to the machine scoring engine 147 and the feedback comments engine 153.

Many changes can be made in the above-described invention without departing from the intent and scope thereof. It is therefore intended that the above description be read in the illustrative sense and not in the limiting sense. Substitutions and changes can be made while still being within the scope and intent of the invention and of the appended claims.

What is claimed is:

1. A process for monitoring, scoring and providing feedback on written text, the process comprising:
    receiving a student development language selection and a feedback prompt mode selection from a user;
    providing a writing assignment to said user in a student development language corresponding to said student development language selection;
    monitoring written text input by said user for the writing assignment in said student development language;
    scoring, by a processor, said monitored written text to produce at least one score;
    providing feedback prompts, via said processor, that include writing improvement instructions for improving said monitored written text input by said user, wherein said feedback prompts are selected as a function of said student development language selection, student proficiency level, said feedback prompt mode selection, and said at least one score for said monitored written text.

2. The process of claim 1 further comprising, receiving a selection of said student proficiency level;
    wherein said student development language selection and said student proficiency level selection are selected on a single touch screen.

3. The process of claim 1 further comprising, receiving a scoring scale selection from said user.

4. The process of claim 3 further comprising, receiving a genre selection from said user.

5. The process of claim 4, wherein said genre selection comprises persuasive, narrative, informative, literary, informational genres.

6. The process of claim 5, wherein said providing feedback prompt mode selection comprises draft feedback and submitted response feedback.

7. The process of claim 1, wherein said feedback prompts comprises topics of feedback on focus and meaning, feedback on content and development, feedback on organization, feedback on language use and style, and feedback on mechanics and conventions.

8. The process of claim 7, wherein each of said topics of feedback are separated into predetermined prompts as a function of score by incremental point change.

9. The process of claim 1, wherein monitoring said written text input by said user comprises:
    receiving a response submission from said user;
    determining whether said response submission is a revision;
    determining whether said revision is in response to a trained or untrained prompt;
    determining a number of additional times revision submissions may be permitted to occur;
    prompting the user when a maximum permitted revision tries has been reached and recording when said maximum permitted revision tries has been has been reached in a user record;
    generating an assignment feedback report for said submission; and
    recording said assignment feedback report in said user record.

10. The process of claim 1, wherein said user is first provided with a split display separated into a first portion for writing assignment and a second portion for written text input typing by the user.

11. The process of claim 10, wherein said feedback prompts are provided to said user in said first portion of said split display.

12. A system for monitoring, scoring and providing feedback on written text, the system comprising:
    a storage component for program code and data; and
    a processor for executing the program code, wherein the processor is configured to to:
    receive a student development language selection and a feedback prompt mode selection;
    provide a writing assignment to a user in a student development language corresponding to said student development language selection;
    monitor written text input by said user for the writing assignment in said student development language;
    score, by a processor, said monitored written text to produce at least one score;
    provide a feedback prompt that includes writing improvement instructions regarding said monitored written text input by said user, wherein said feedback prompt is selected as a function of said student development language selection, student proficiency level, said feedback prompt mode selection, and said at least one score for said monitored written text.

13. The system of claim 12, wherein at least one of said student development language selection and said feedback prompt mode selection is received from said user.

14. The system of claim 12, wherein said storage component is configured to store a past performance for said user of a past essay assignment in said student development language.

15. The system of claim 14, wherein said feedback prompt is further based on said past performance of said user.

16. A process for monitoring, scoring and providing feedback on written text, the process comprising:
    determining a student development language selection and a feedback prompt mode selection based on performance information associated with a user;

providing a writing assignment to said user in a student development language corresponding to said determined student development language selection;

monitoring written text input by said user for the writing assignment in said student development language;

scoring, by a processor, said monitored written text to produce at least one score;

providing feedback prompts, via said processor, that include writing improvement instructions for improving said monitored written text input by said user, wherein said feedback prompts are based on said performance information of said user and said at least one score for said monitored written text.

17. The process of claim 16, wherein said performance information comprises a past performance for said user of a past essay assignment in said student development language.

18. The process of claim 1, wherein the at least one score includes at least one domain score and at least one editing score.

19. The process of claim 1, wherein the at least one score includes at least two of a narrative score, an informative score, a literary score, a persuasive score, or an informational score.

20. The process of claim 1, wherein the feedback prompts are provided in real-time while the user is inputting the written text.

21. The process of claim 1, further comprising determining, by said processor, said student proficiency level.

* * * * *